(12) United States Patent
Sekine (10) Patent No.: US 6,603,304 B2
(45) Date of Patent: Aug. 5, 2003

(54) INDEX POSITION DETECTOR FOR SPINDLE MOTOR AND MOTOR APPARATUS INCLUDING THE SAME

(75) Inventor: Mikio Sekine, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/790,226

(22) Filed: Feb. 21, 2001

(65) Prior Publication Data

US 2002/0059038 A1 May 16, 2002

(30) Foreign Application Priority Data

Feb. 22, 2000 (JP) ........................................ 2000-044891

(51) Int. Cl.⁷ ............................ G01B 7/30; H02K 11/00
(52) U.S. Cl. ........................... 324/207.15; 324/207.25; 310/68 B
(58) Field of Search ................... 324/207.15, 207.25, 324/173, 174; 310/68 B, 168; 318/653, 254; 360/73.03

(56) References Cited

U.S. PATENT DOCUMENTS

| | | | | |
|---|---|---|---|---|
| 3,483,457 A | * | 12/1969 | Fertig et al. | 318/138 |
| 4,295,085 A | * | 10/1981 | Lafuze | 318/721 |
| 5,371,635 A | | 12/1994 | Sakaguchi et al. | |
| 5,408,153 A | * | 4/1995 | Imai et al. | 310/68 B |
| 5,610,457 A | | 3/1997 | Kurita | 310/68 B |
| 5,654,600 A | * | 8/1997 | Nomura et al. | 310/68 B |
| 5,717,299 A | * | 2/1998 | Inagaki et al. | 318/254 |
| 5,995,314 A | * | 11/1999 | Furuki et al. | 360/73.03 |

* cited by examiner

Primary Examiner—N. Le
Assistant Examiner—Darrell Kinder
(74) Attorney, Agent, or Firm—Brinks Hofer Gilson & Lione (57) ABSTRACT

An index position detector for a spindle motor includes a rotor magnet which is provided on an inner surface of a flange portion of a rotor yoke. A window portion is formed in the flange portion such that a part of the rotor magnet faces outwardly. An inductor is disposed in a stator section and opposes the periphery of the flange portion. The inductor detects a magnetic flux of the rotor magnet via the window portion.

28 Claims, 9 Drawing Sheets

FIG. 9A  INPUT TO THE COMPARATOR 12

FIG. 9B  OUTPUT FROM THE COMPARATOR 12

FIG. 9C  OUTPUT FROM THE MONOSTABLE MULTIVIBRATOR 15

INDEX POSITION DETECTOR FOR SPINDLE MOTOR AND MOTOR APPARATUS INCLUDING THE SAME

BACKGROUND OF THE INVENTION

1. Field of the Invention

The present invention relates to an index position detector for a spindle motor which rotates rotating recording media such as floppy disks, and also relates to a motor apparatus including the index position detector.

2. Description of the Related Art

With regard to spindle motors which rotate rotating recording media, for example, floppy disks, an index signal which provides one pulse for each rotation is required to determine the starting point for writing data. The index signal is also used for detecting the rotational condition of the floppy disk, or the motor, so as to provide a ready signal for writing or reading. In addition, the index signal is also used to start writing in the process of formatting tracks, and to stop the writing when the rotation stops.

Figure 10:
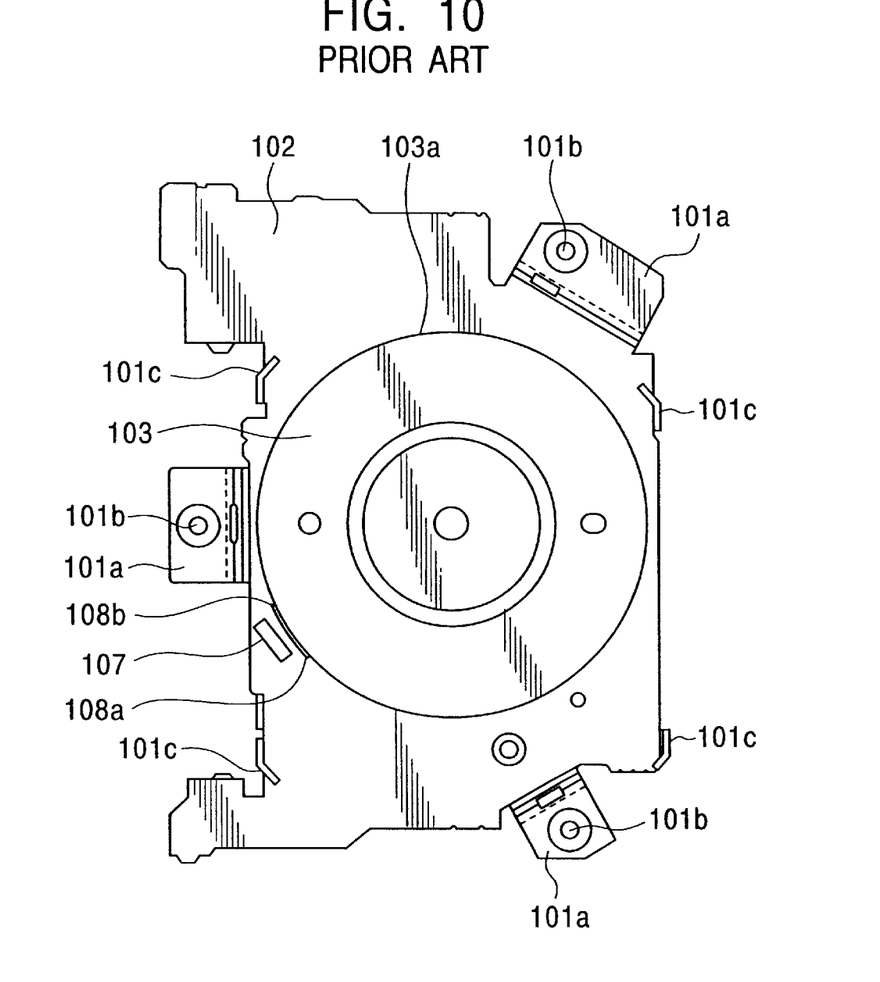
FIG. 10 is a plan view of a motor apparatus including an index position detector for a spindle motor of the conventional type.
Figure 11:
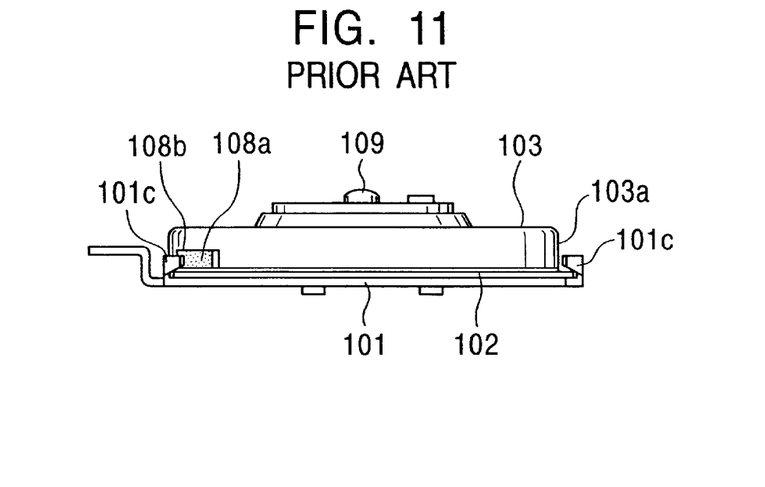
FIG. 11 is a front view of the motor apparatus including the index position detector for the spindle motor shown in FIG. 10.
Figure 12:
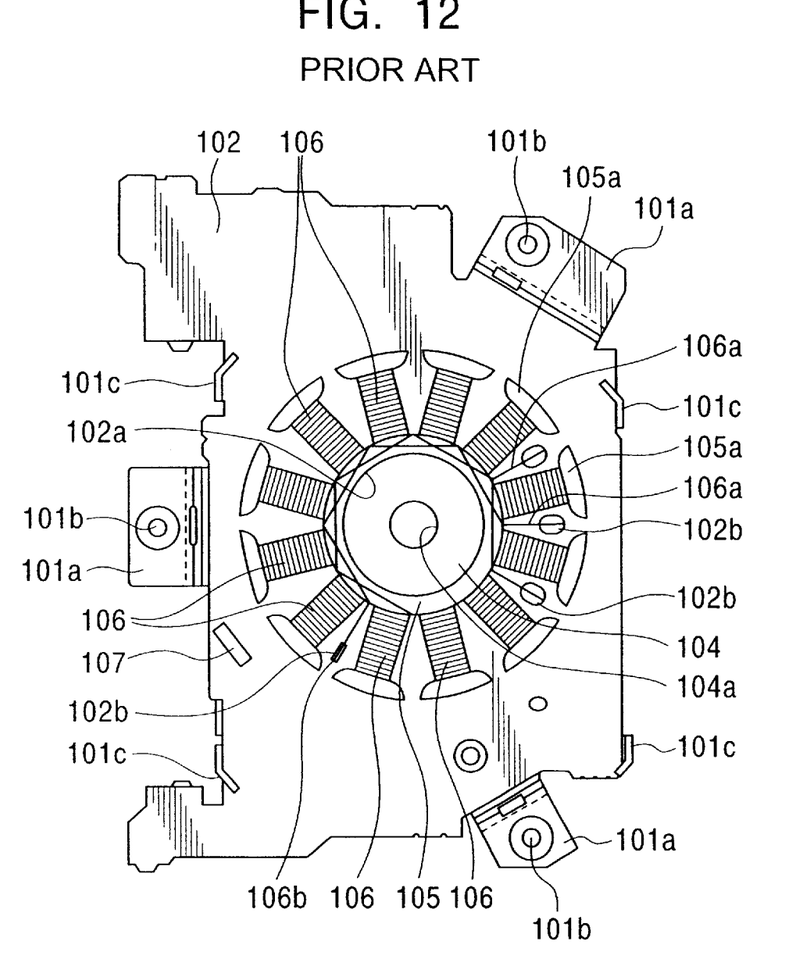
FIG. 12 is a plan view of the motor apparatus including the index position detector for the spindle motor shown in FIG. 10, from which the rotor yoke is excluded.

FIGS. 10 to 12 conceptually show a construction of a motor apparatus including an index position detector which detects the index position of the spindle motor. Referring to the figures, the motor apparatus includes a mount 101, a circuit board 102 which is mounted on the mount 101, and a rotor yoke 103. The mount 101 is constructed of a metal plate, and is provided with three attachment tabs 101a at the periphery thereof. Each of the attachment tabs 101a is formed unitarily with the mount 101 and is bent upward in an L-shape. In addition, the attachment tabs 101a are provided with attachment holes 101b for fixing the mount 101 to a housing of a floppy disk drive (FDD) by screws or by other means. The mount 101 is also provided with four restraining hooks 101c at the periphery thereof. The restraining hooks 101c are shaped approximately like the letter L and project upward. As shown in FIGS. 10 and 11, a part of each of the restraining hooks 101c is bent in the horizontal direction so as to press downward and hold the circuit board 102, which is disposed on the mount 101.

The circuit board 102 is constructed with an insulated substrate on which wiring patterns and circuit components such as a driver circuit and a driver control circuit (not shown) are mounted. The circuit board 102 is provided with a bearing hole 102a at the center thereof, through which a bearing 104 having a shaft hole 104a is inserted. The bearing 104 is attached to the mount 101, and is provided with an iron-core member 105. The iron-core member 105 has twelve pole pieces 105a which are arranged radially at even intervals, and stator coils 106 are formed around the pole pieces 105a. The stator coils 106 may be divided into three types for applying three phases, U-phase, V-phase, and W-phase. Three coil terminals 106a for the three types of the stator coils 106 and one common coil terminal 106b are soldered on lands 102b provided on the circuit board 102. The iron-core member 105 is constructed of, for example, a laminated iron core formed by punching out a plurality of magnetic steel plates, such as ferrosilicon plates, and stacking them. In addition, a Hall device 107 for detecting the index position of a rotating recording media is mounted on the circuit board 102, so as to oppose one of the pole pieces 105a.

Figure 13:
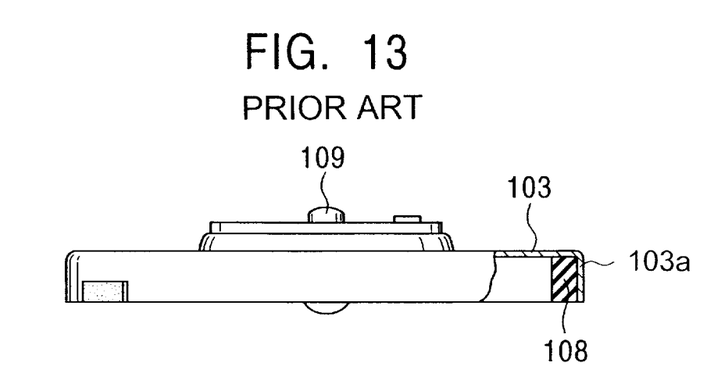
FIG. 13 is a front view of the rotor yoke shown in FIG. 10, of which a part is broken away.
Figure 14:
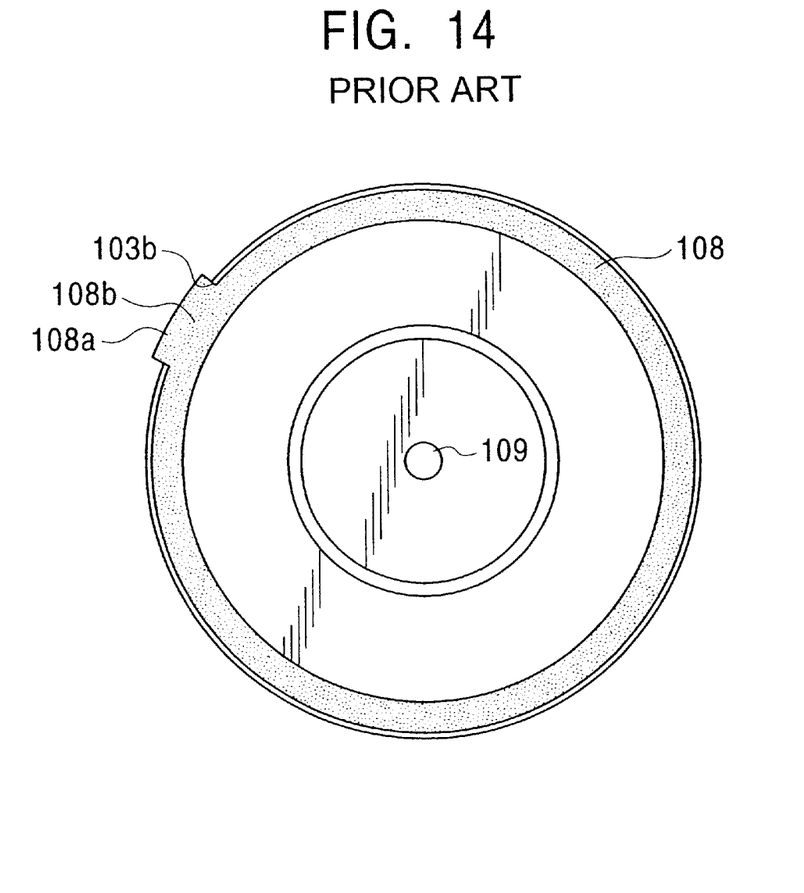
FIG. 14 is a rear view of the rotor yoke shown in FIG. 13.

As shown in FIGS. 13 and 14, the rotor yoke 103 has a shape like a shallow dish inverted on the circuit board 102, including a flange portion 103a at the periphery thereof. A ring-type rotor magnet 108 is affixed on the inner wall of the flange portion 103a. The rotor magnet 108 is constructed of a resin, such as a rubber or a plastic, containing magnetic material. The rotor magnet 108 is equally divided along the periphery thereof into, for example, sixteen portions, which are magnetized so as to alternate S-pole and N-pole. In addition, a window portion 103b having a predetermined width is formed in the flange portion 103a. A pair of dipolar magnets 108a and 108b is provided to the rotor magnet 108 so as to project out through the window portion 103b beyond the periphery of the flange portion 103a. Alternatively, the dipolar magnets 108a and 108b may be separated from the rotor magnet 108 and be stuck on the periphery of the rotor magnet 108.

The rotor yoke 103 is also provided with a shaft 109 which penetrates through the center thereof, and the lower side of the shaft is inserted through the shaft hole 104a formed in the bearing 104. Accordingly, the rotor yoke 103 is rotatably disposed above the circuit board 102 as shown in FIG. 10 so as to cover the stator coils 106, in a manner such that the Hall device 107 opposes the flange portion 103a at the periphery thereof. Although not shown in the figures, a thrust bearing is disposed under the shaft hole 104a so as to support the shaft 109 at the bottom end. Thus, the shaft 109 can smoothly rotate while being supported by the shaft hole 104a and the thrust bearing. In addition, a chucking device for receiving and holding the floppy disk at the center hub thereof (not shown in the figure) is mounted on the rotor yoke 103.

The operation of the index position detector for the spindle motor will be described below. First, a three-phase AC power supply applies a three-phase alternating current to the stator coils 106 of three types for U-phase, V-phase and W-phase, by switching the current in a predetermined order. Accordingly, magnetic opposing force is continuously generated between the stator coils 106 and the rotor magnet 108, so that the rotor yoke 103 rotates above the circuit board 102, which is a part of the stator. The switching of the current is performed by detecting the rotational position using position detectors, for example, three Hall devices disposed between the stator coils 106, and by using the detection signal as a switching control signal.

Figure 15:
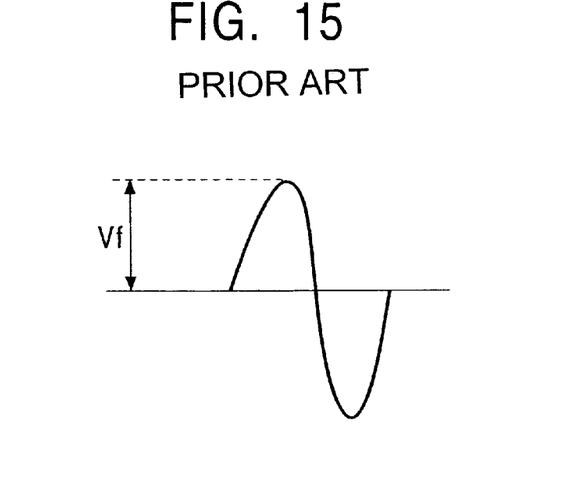
FIG. 15 is a waveform of the output voltage obtained from the Hall device shown in FIG. 12.

When the rotor yoke 103 of the spindle motor rotates as described above, the dipolar magnets 108a and 108b also rotate along with the rotation of the rotor yoke 103. Accordingly, the dipolar magnets 108a and 108b periodically move toward and away from the Hall device 107. When the dipolar magnets 108a and 108b are away, the Hall device 107 receives a small amount of magnetic flux, so that the detection output is approximately 0. When the dipolar magnets 108a and 108b are in proximity, the Hall device 107 receives sufficient magnetic flux, so that the detection output increases or decreases in accordance with the movement of the dipolar magnets 108a and 108b. The detected output $V_f$ obtained from the Hall device 107 is calculated by $V_f = k_\Phi \Phi$, so that the detection output $V_f$ is proportional to an amount of the magnetic flux which affects the Hall device 107, as shown in FIG. 15. The detection output is then compared with a predetermined reference voltage to obtain a square wave signal representing the result of the comparison. The square wave signal is used for generating an index signal which provides a pulse at the same time when, for example, the square wave signal provides a rising edge.

The conventional index position detector for the spindle motor, however, has the following problems. That is, an expensive Hall device 107 is required for detecting the magnetic flux from the dipolar magnets 108a and 108b with high sensitivity. In addition, the window portion 103b must be formed in the flange portion 103a of rotor yoke 103, and the end portions of the dipolar magnets 108a and 108b must project far beyond the window portion 103b. Accordingly, high processing cost is incurred when the dipolar magnets 108a and 108b are combined with the rotor magnet 108. When the dipolar magnets 108a and 108b are independently provided, and are affixed on the ring-type rotor magnet 108, there is also a problem in that the gap loss of the magnetic flux density occurs, which degrades the detection sensitivity of the Hall device 107. Additionally, variations in the ambient temperature result in variations in the amplitude of the magnetic flux detection signal and thus a corresponding change in the detection sensitivity of the detector.

SUMMARY OF THE INVENTION

Accordingly, it is an object of the present invention to provide an index position detector for a spindle motor which is free from the above-described problems, and which realizes the detection of the index position by using the rotor yoke with a simple and cost-saving construction which includes the conventional window portion. It is also an object of the present invention to provide an index position detector having a stable magnetic flux detection signal amplitude and detection sensitivity with regard to the ambient temperature. In addition, it is another object of the present invention to realize high-precision determination of a starting point for writing data on a rotating recording media.

For attaining the above-described objects, an index position detector for a spindle motor according to the present invention includes a rotor yoke with a flange portion having an inner surface, a rotor magnet which is provided on the inner surface of the flange portion of the rotor yoke, a window portion formed in the flange portion such that a part of the rotor magnet faces outside, and an inductor which is disposed in a stator section to oppose the periphery of the flange portion and which detects a magnetic flux of the rotor magnet via the window portion.

According to the present invention, the high-sensitivity inductor directly receives the magnetic flux from the part of the rotor magnet which is facing outside via the window portion formed in the flange portion of the rotor yoke. Thus, the index signal is more reliably obtained based on the detection output from the inductor at low cost by using the conventional rotor yoke.

The inductor may be disposed to oppose the periphery of the flange portion such that the central axis of a coil contained in the inductor is approximately parallel to the tangential direction of the periphery of the rotor yoke.

Accordingly, the magnetic flux of the rotor magnet more efficiently affects the inductor via the window portion, so that the sensitivity of the magnetic flux detection by the inductor is increased. Thus, reliability of the index signal generation is also increased.

According to another aspect of the present invention, a motor apparatus comprises a circuit board which is disposed above a mount, a rotor yoke which is rotatably supported by the mount, a rotor magnet which is provided to an inner surface of a flange portion of the rotor yoke, stator coils which are disposed between the rotor yoke and the mount and which are arranged radially around the rotational center of the rotor yoke, lands which are provided on the circuit board at positions between the stator coils to connect coil terminals of the stator coils, and an inductor which is mounted on the circuit board to oppose the periphery of the flange portion and which detects a magnetic flux of the rotor magnet via the window portion. The circuit board is formed so as not to expand over one side of the mount relative to the rotational center of the rotor yoke.

Since the circuit board is formed within one side of the mount, the area of the circuit board is reduced, so that the motor is smaller and lighter than the conventional motor. To form the circuit board within one side of the mount, the coil terminals of the stator coils are connected to the lands which are provided on the circuit board at positions between the stator coils.

In addition, the magnetic flux of the rotor magnet more efficiently affects the inductor via the window portion, so that the sensitivity of the magnetic flux detection by the inductor is increased. Thus, reliability of the index signal generation is also increased.

The lands on which the coil terminals of the stator coils are soldered are provided on the circuit board on which the inductor is mounted, and the area of the circuit board is less than half the area of the mount.

Accordingly, the area of the circuit board is reduced. Thus, the circuit board may be more easily attached to the mount, and a smaller motor may be manufactured at a low cost.

According to the present invention, such a construction is applied so that a part of the rotor magnet disposed inside the rotor yoke faces outside through the window portion via the flange portion. The magnetic flux of the rotor magnet affects, through the window portion, the inductor which is disposed at the periphery of the rotor. Thus, high-sensitivity and low-cost detection of the index position is possible, and an index signal having large amplitude is obtained without using hall sensors or providing the rotor magnet with dipolar magnets. Accordingly, a timing process of, for example, determining the starting point for data recording on the rotating recording media, is realized with high precision.

In addition, the inductor is disposed to oppose the flange portion such that the central axis of the coil contained in the inductor is approximately parallel to the tangential direction of the rotor yoke. Accordingly, the coil in the inductor may be affected by a weak magnetic flux emanating from parts deeper inside the rotor magnet compared to the part close to the window portion of the rotor yoke, which increases the precision of the index position detection.

In addition, the lands on which the coil terminals of the stator coils with which the spindle motor is constructed are connected to the lands which are provided on the circuit board on which the inductor is mounted. Thus, the area of the circuit board may be reduced to less than half the area of the metal mount. Accordingly, the circuit board may be more easily attached to the mount, and the cost for the circuit board may be reduced. In addition, the entire body of the index position detector and the spindle motor may be lighter and smaller.

DESCRIPTION OF THE PREFERRED EMBODIMENT

Figure 1:
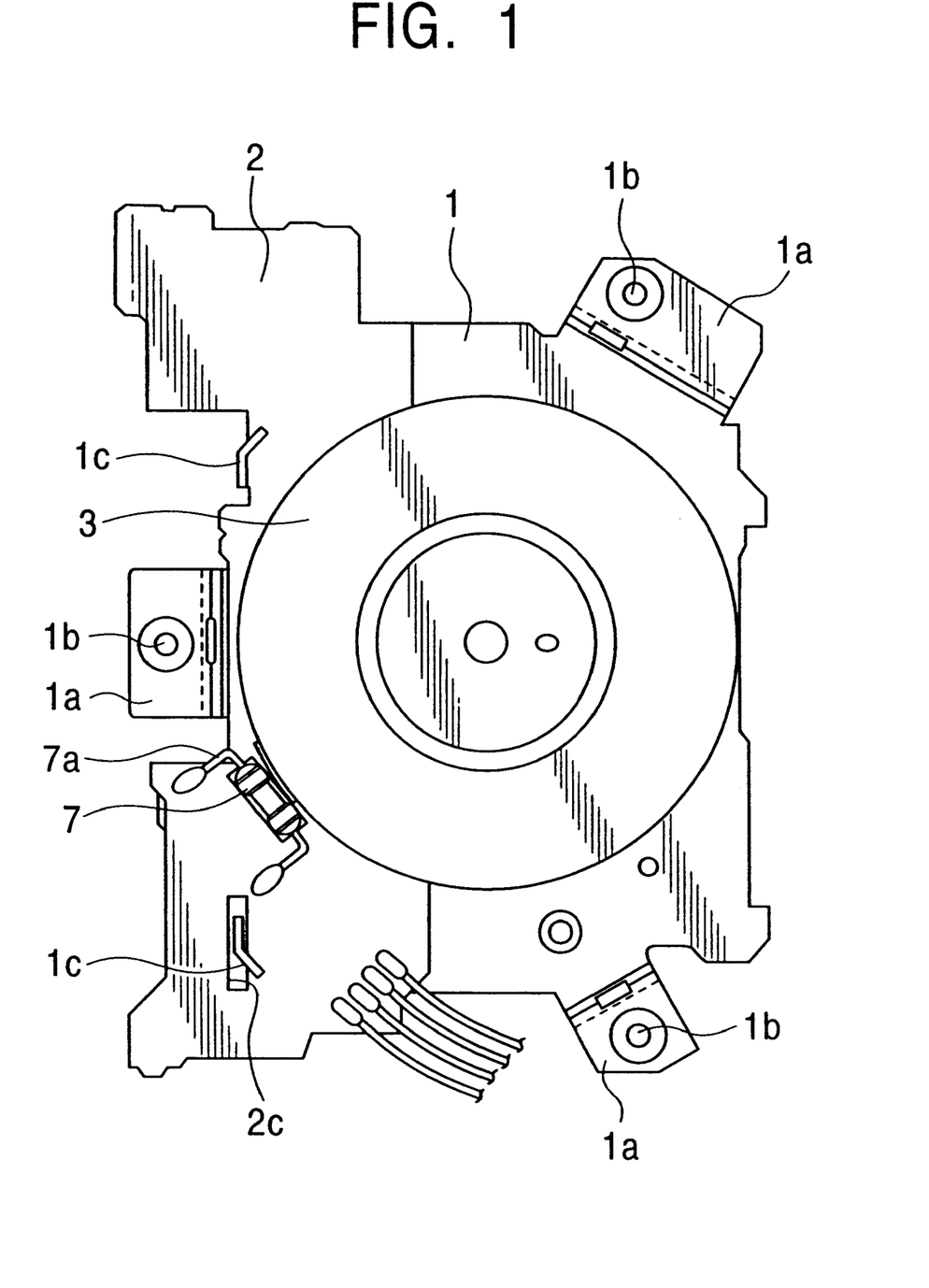
FIG. 1 is a plan view of a motor apparatus including an index position detector for a spindle motor according to an embodiment of the present invention.
Figure 2:
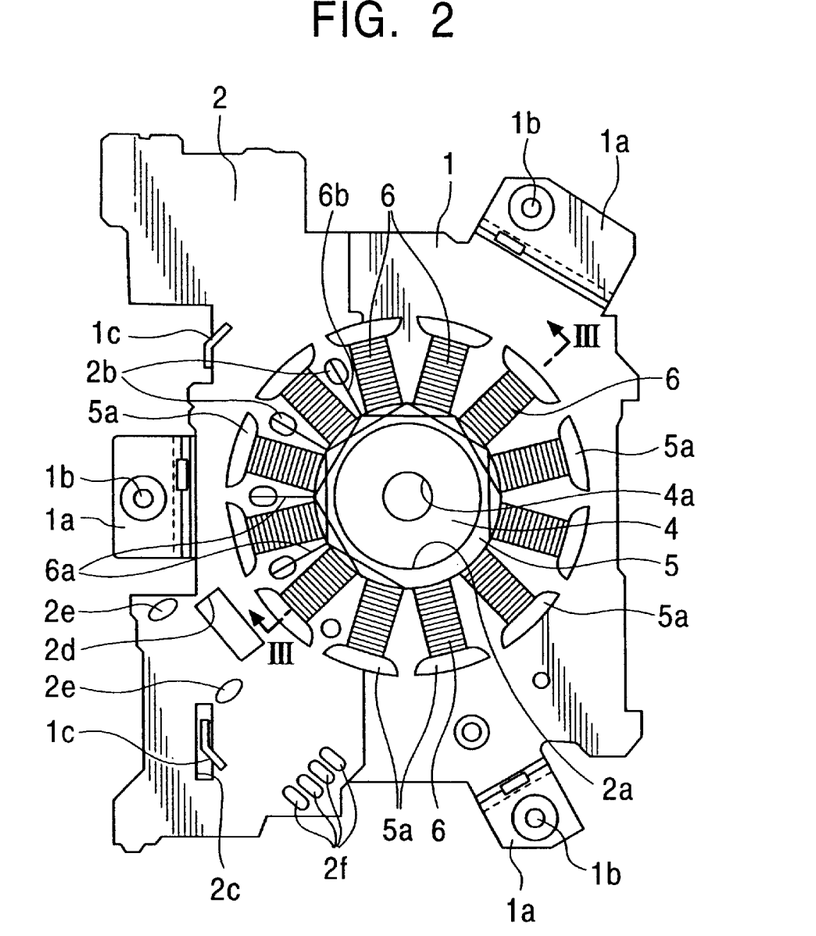
FIG. 2 is a plan view of the motor apparatus including the index position detector for the spindle motor shown in FIG. 1, from which the rotor yoke is excluded.

An embodiment of the present invention will be described in detail in the following. FIG. 1 is a plan view conceptually showing a motor apparatus including an index position detector for a spindle motor according to the present invention, and FIG. 2 is a plan view conceptually showing a stator section of the motor apparatus shown in FIG. 1.

The spindle motor includes a circuit board 2 which is mounted on a mount 1, and a rotor yoke 3. The mount 1 is constructed of a metal plate, and is provided with three attachment tabs 1a at the periphery thereof. Each of the attachment tabs 1a is formed unitarily with the mount 1, and is bent upward in an L-shape. In addition, the attachment tabs 1a are provided with attachment holes 1b, for fixing the mount 1 to a housing of a floppy disk drive by screws or by other means. The mount 1 is also provided with two restraining hooks 1c at the periphery thereof. The restraining hooks 1c are shaped approximately like the letter L and project upward. The restraining hooks 1c press downward and hold the circuit board 2, one at the periphery thereof and the other at the edge of a through hole 2c formed in the circuit board 2. As shown in FIG. 1, a part of each of the restraining hooks 1c is bent in the horizontal direction so as to press and hold the circuit board 2.

Figure 3:
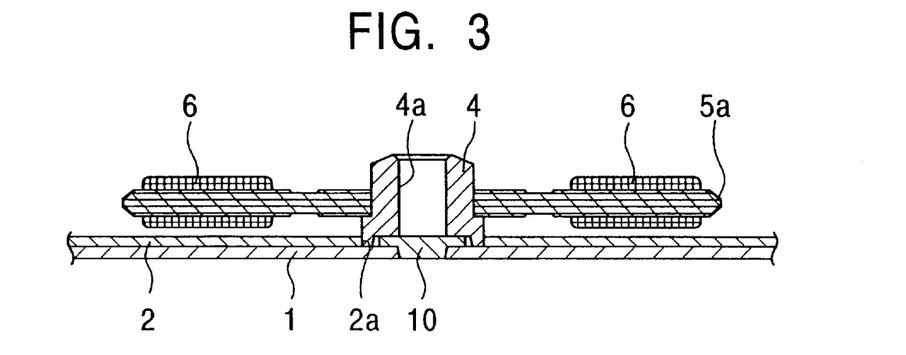
FIG. 3 is a sectional view of FIG. 2, which is cut along the line II–II.

The circuit board 2 is constructed with an insulated substrate on which wiring patterns and circuit components such as a driver circuit and a driver control circuit (not shown) are mounted. The area of the circuit board 2 is half the area of the mount 1, and the circuit board 2 is disposed at the side in which an inductor 7, which will be described below, is provided. As shown in FIG. 3, the circuit board 2 is provided with an opening 2a at one side, through which a bearing 4 having a shaft hole 4a is inserted. The bearing 4 is attached to the mount 1, and is provided with an iron-core member 5. The iron-core member 5 has twelve pole pieces 5a which are arranged radially at even intervals, and stator coils 6 are formed around the pole pieces 5a. The stator coils 6 may be divided into three types for applying three phases, U-phase, V-phase, and W-phase. Three coil terminals 6a for the three types of the stator coils 6 and one common coil terminal 6b are soldered on lands 2b provided on the circuit board 2. As shown in FIG. 3, the iron-core member 5 is constructed with, for example, a laminated iron core formed by punching out a plurality of magnetic steel plates, such as ferrosilicon plates, and stacking them. In addition, the inductor 7 for detecting the index position of the recording medium is disposed as shown in FIG. 1 in a long hole 2d formed in the circuit board 2, so as to oppose one of the pole pieces 5a. The circuit board 2 is also provided with a land 2e for soldering lead terminals 7a of the inductor 7.

Figure 4:
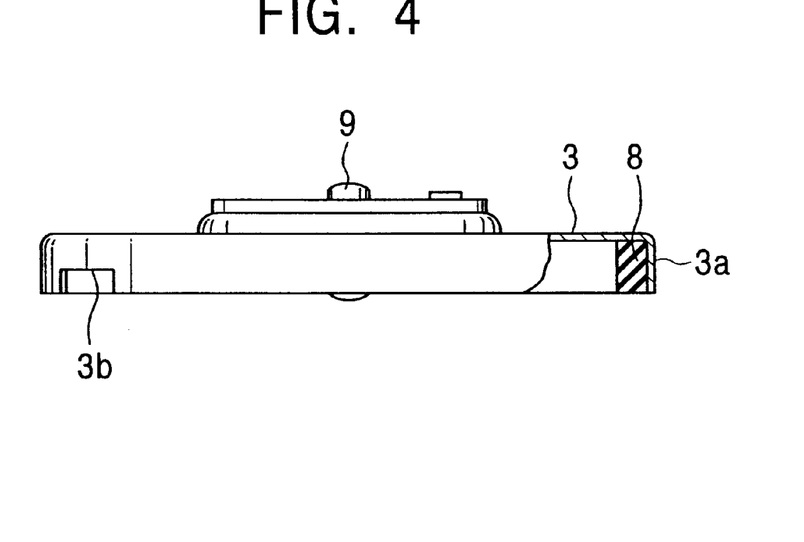
FIG. 4 is a front view of the rotor yoke shown in FIG. 1, in which a part is broken away.
Figure 5:
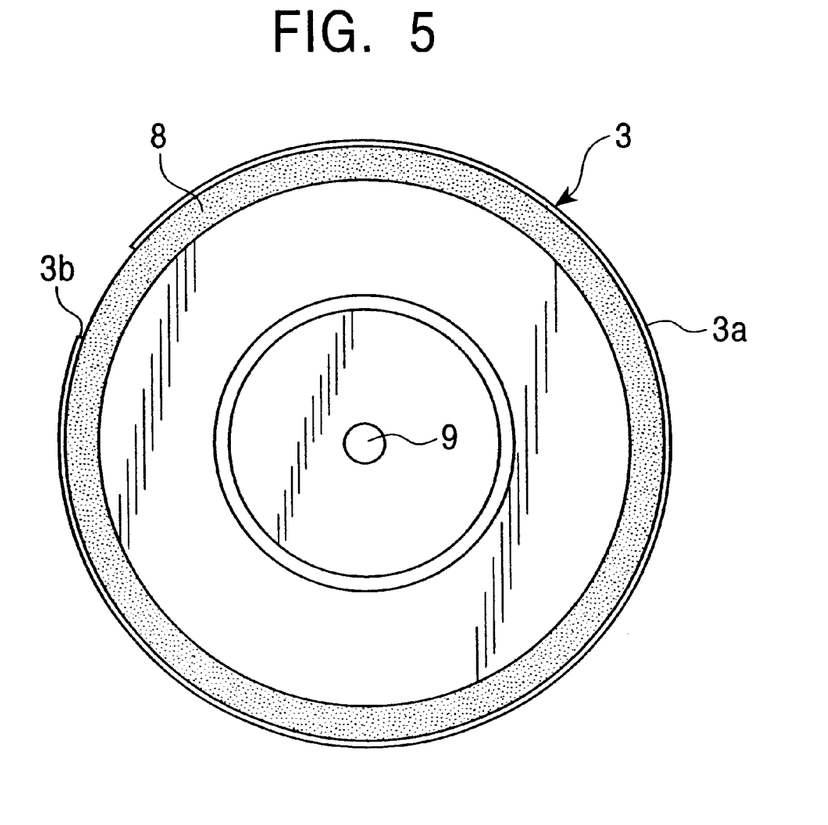
FIG. 5 is a rear view of the rotor yoke shown in FIG. 1.

As shown in FIGS. 4 and 5, the rotor yoke 3 has a shape like a shallow dish inverted on the circuit board 2, including a flange portion 3a at the periphery thereof. A ring-type rotor magnet 8 is affixed on the inner wall of the flange portion 3a. The rotor magnet 8 comprises a resin, such as a rubber or a plastic, and the cross sectional shape of the rotor magnet 8 does not vary in the circumferential direction. In addition, the rotor magnet 8 is equally divided along the periphery into, for example, sixteen portions, which are magnetized so as to alternate S-pole and N-pole. The flange portion 3a of the rotor yoke 3 is provided with a window portion 3b having a predetermined width, through which a part of the rotor magnet 8 is facing outside. Accordingly, the window portion 3b is not provided with dipolar magnets as in the conventional type. The window portion 3b periodically opposes the inductor 7 in accordance with the rotation of the rotor magnet 8. The circuit board 2 is also provided with four lands 2f for connecting external leads, and the lands 2f are connected to the lands 2b via electric wires formed on the circuit board 2.

The rotor yoke 3 is also provided with a shaft 9 which penetrates through the center thereof, and the lower side of the shaft is inserted through the shaft hole 4a formed in the bearing 4. Accordingly, the rotor yoke 3 is disposed above the circuit board 2 as shown in FIG. 1 so as to cover the stator coils 6 (see FIGS. 2 and 3), in a manner such that the inductor 7 opposes the flange portion 3a at the periphery thereof. In addition, a thrust bearing 10 is disposed under the shaft hole 4a, so as to support the shaft 9 at the bottom end. Thus, the shaft 9 can smoothly rotate while being supported by the shaft hole 4a and the thrust bearing 10. In addition, a chucking device for receiving and holding the floppy disk at the center hub (not shown) is mounted on the rotor yoke 3.

The operation of the index position detector for the spindle motor according to the present invention will be described below. First, a three-phase AC power supply applies a three-phase alternating current to the stator coils 6 of three types for U-phase, V-phase, and W-phase, by switching the current in a predetermined order. Accordingly, a magnetic opposing force is continuously generated between the stator coils 6 and the rotor magnet 8, so that the rotor yoke 3 rotates above the mount 1 and the circuit board 2, which are a part of the stator. The switching of the current is performed by detecting the voltage induced by each of the stator coils to determine the rotational position, and by using the detection signal as a switching control signal. Thus, the Hall devices required in the conventional motor apparatus (see prior art FIGS. 13 and 14) may be omitted, and the area of the circuit board 2 may be reduced.

Figure 7:
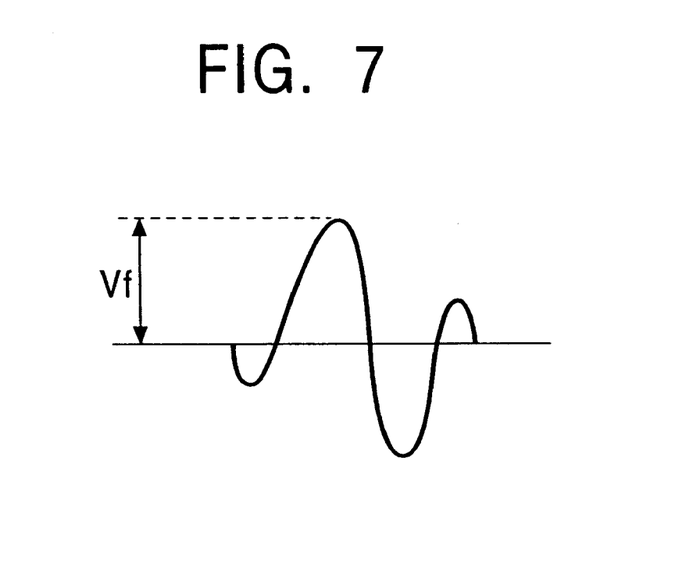
FIG. 7 is a waveform of the induced voltage signal obtained from the inductor shown in FIG. 1.

When the rotor yoke 3 of the spindle motor rotates as described above, the rotor magnet 8 which is facing outside via the window portion 3b also rotates along with the rotation of the rotor yoke 3. Accordingly, the outwardly facing part of the rotor magnet 8 periodically moves toward and away from the inductor 7. When the outwardly facing part of the rotor magnet 8 is distant, the inductor 7 receives small amount of magnetic flux, so that the inducted voltage is approximately 0. When the outwardly facing part of the rotor magnet 8 is in proximity, the inductor 7 receives sufficient magnetic flux from the rotor magnet 8, so that the voltage induced by the inductor 7 varies proportionally to the time variation of the magnetic flux. The induced voltage $V_f$ obtained from the inductor 7 is calculated by $V_f=-k(d\Phi/dt)$, as shown in FIG. 7. The induced voltage is then compared with a predetermined reference voltage to obtain a square wave signal representing the result of the comparison. The square wave signal is used for generating an index signal which provides a pulse at the same time when, for example, the square wave signal provides a rising edge.

Figure 6:
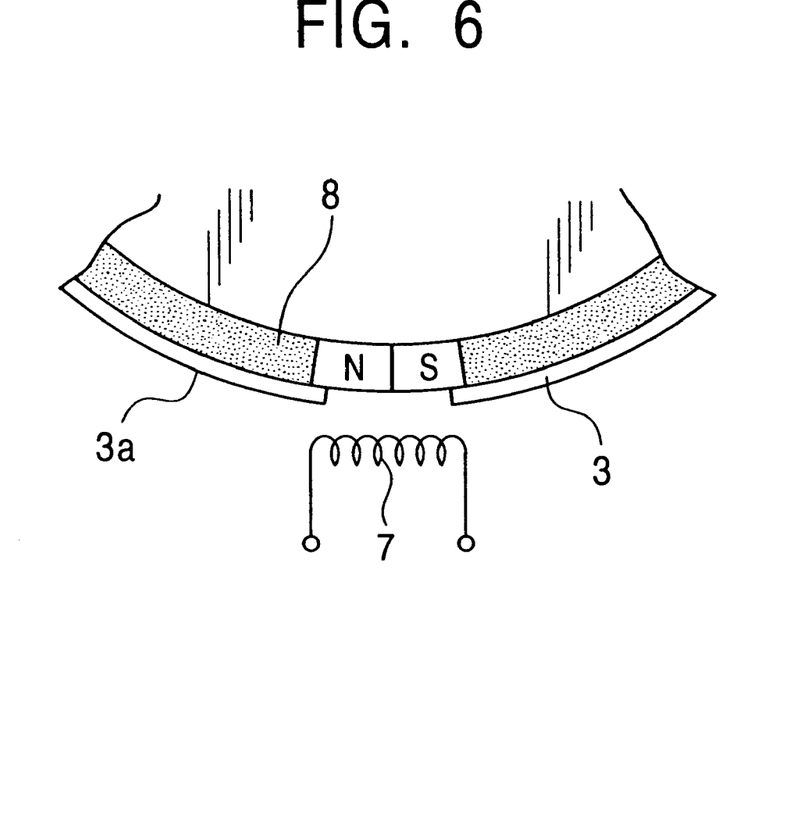
FIG. 6 is a schematic representation showing the positional relationship between the coil in the inductor shown in FIG. 1 and the rotor magnet.

As shown in FIG. 6, the inductor 7 is disposed in a manner such that the central axis of a coil contained in the inductor 7 is approximately parallel to the tangential direction of the rotor yoke 3. Accordingly, the amount of magnetic flux which affects the inductor 7 is at a maximum, so that the sensitivity of the magnetic flux detection is sufficiently increased. As described above, the voltage induced by the inductor 7 varies proportionally to the time variation of the magnetic flux. Thus, required induction voltage may be obtained by increasing the rotational speed of the rotor yoke 3, even when the amount of the magnetic flux obtained from the rotor magnet 8 is small. However, as it is the tangential (i.e. linear) speed of the rotor magnet 8 that is important for creating the change in magnetic flux and the tangential speed is proportional to the product of the rotational speed and the radius of the rotor magnet 8, insufficient magnetic flux may be alternatively compensated for by increasing the diameter of the rotor yoke 3 to increase the tangential speed while maintaining the original rotational speed.

In the case of using the inductor 7, the induced voltage includes a sub-peak as shown in FIG. 7, which does not arise in the conventional case in which the Hall devices 107 are used (see prior art FIG. 10). This sub-peak impedes accurate detection of the index position. Thus, the sub-peak is excluded by masking as described below.

Figure 8:
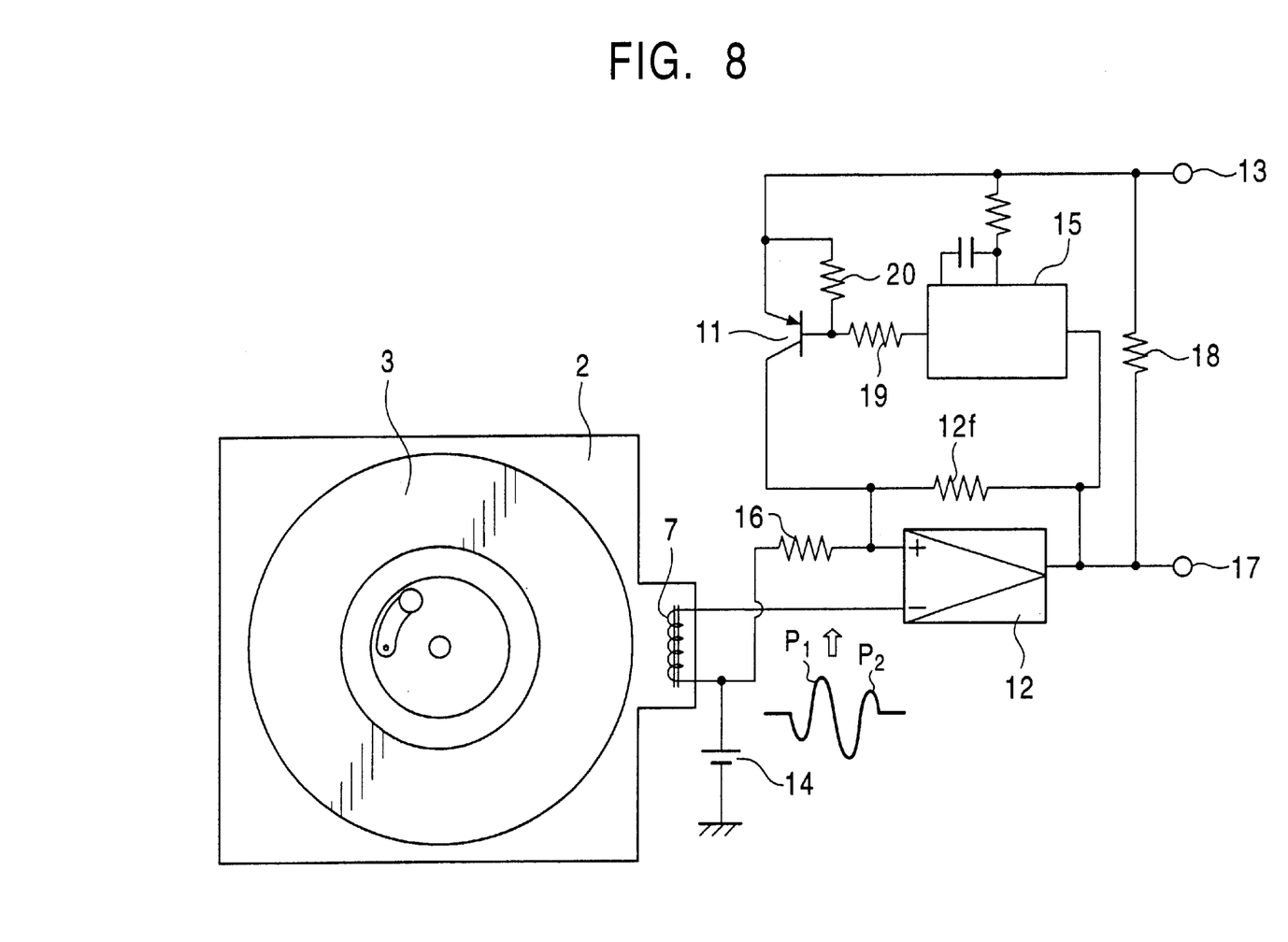
FIG. 8 is a circuit diagram of a sub-peak masking circuit for masking a sub-peak included in the induced voltage signal obtained from the inductor.
Figures 9A, 9B, 9C:
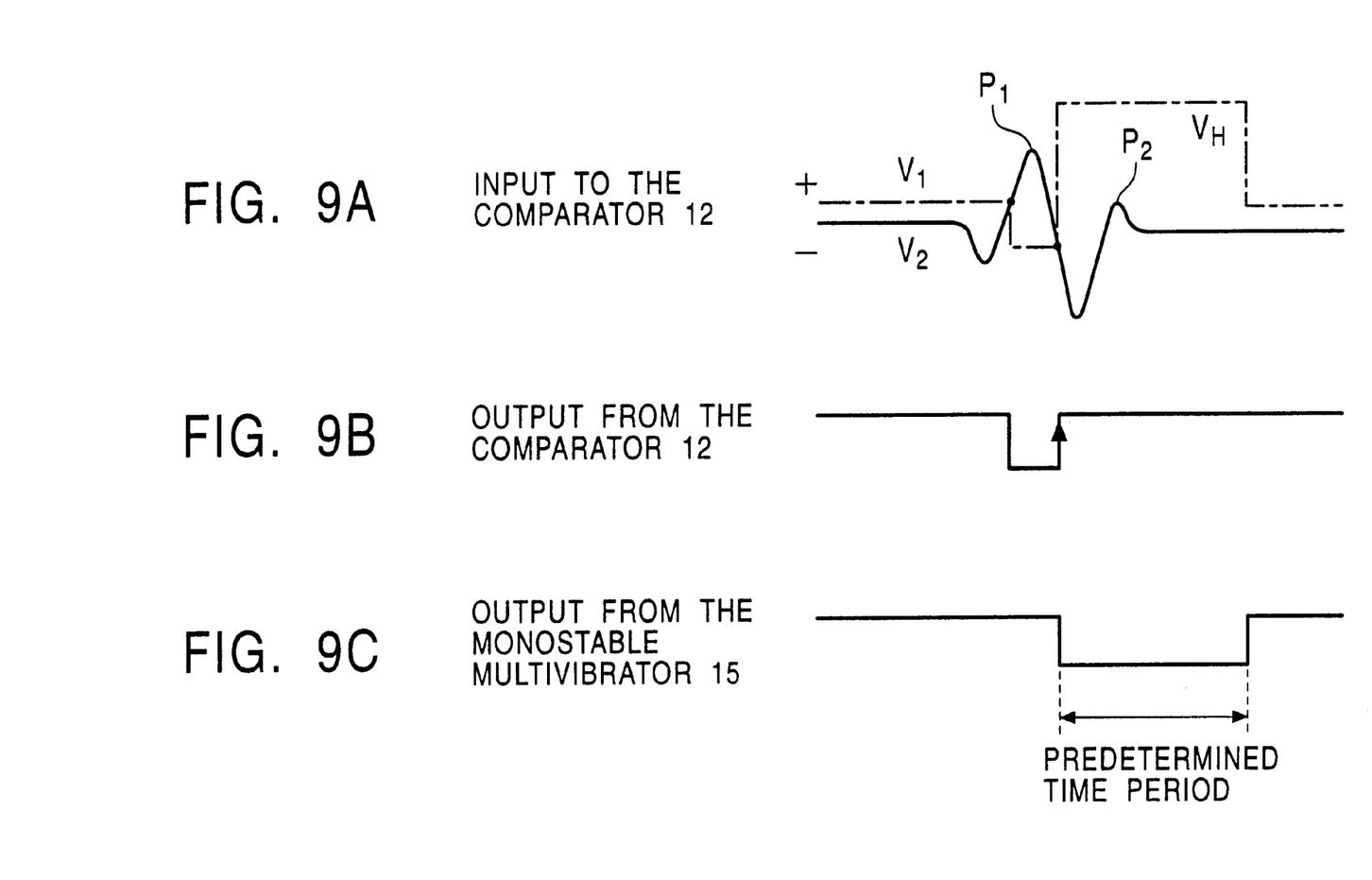
FIGS. 9A, 9B, and 9C are waveforms of the signals obtained in the circuit shown in FIG. 8.

FIG. 8 shows an index signal generating circuit which excludes the sub-peak and generates the index signal, and FIG. 9 shows waveforms of voltages obtained at certain points in the circuit. The index signal generating circuit includes a comparator 12 which compares the induced voltage obtained from the inductor 7 and a mask signal obtained from a transistor 11, a power supply terminal 13, a bias power supply 14, a monostable multivibrator (mask-voltage generator) 15 which outputs a square wave signal for a predetermined time period after receiving the result of the comparison from the comparator 12, and the transistor 11 which switches the square wave signal obtained from the monostable multivibrator 15 to generate the mask signal.

A recursive resistor 12*f* is connected between the non-inverting input terminal and the output terminal of the comparator 12. The inverting input of the comparator 12 is connected to one end of the inductor 7, and the output terminal of the comparator 12 is connected to a signal output terminal 17 and to the power supply terminal 13 via a resistor 18. The bias power supply 14 is connected between the other end of the inductor 7 and the ground. The other end of the inductor 7 is also connected with the non-inverting end on the comparator 12 through a resistor 16. The input terminal of the monostable multivibrator 15 is connected to the output terminal of the comparator 12, and the output terminal of the monostable multivibrator 15 is connected to the base of the transistor 11 via a resistor 19. A resistor 20 is connected between the base and the emitter of the transistor 11. The collector of the transistor 11 is connected to the non-inverting input terminal of the comparator 12, and the emitter of the transistor 11 is connected to the power supply terminal 13.

In accordance with the rotation of the rotor yoke 3 and the rotor magnet 8, the inductor 7 detects the periodic proximity of the outwardly facing part of the rotor 8 by using the time variation of the magnetic flux, and outputs the magnetic flux detection signal. As shown in FIG. 8 and FIG. 9A by continuous lines, the detection output representing the induced voltage has two positive-polarity peaks, $P_1$ and $P_2$. The comparator 12 compares the voltage input (first input) obtained from the non-inverting input terminal and the magnetic flux detection signal (second input) obtained from the inverting input terminal. Referring to FIG. 9A, the first input is shown by the dotted-chain line, and the second input is shown by the solid line. As shown in FIG. 9B, the comparator 12 outputs a negative-polarity output which falls when the second input voltage exceeds the first input voltage, and rises when the first input voltage exceeds the second input voltage. The output from the comparator is supplied to the signal output terminal 17.

As shown in FIG. 9C, the monostable multivibrator 15 reacts to the rising edge of the output from the comparator, and generates a negative-polarity square wave signal for a predetermined time period. The transistor 11 is ON during the time period in which the square wave signal is supplied, so as to input high voltage $V_H$ to the non-inverting input terminal of the comparator 12, as shown by the dotted-chain line in FIG. 9A. The high voltage $V_H$ is approximately the same as the power supply voltage $V_{cc}$. During the time period in which the high voltage $V_H$ is supplied to the non-inverting input terminal of the comparator 12, the first input voltage is sufficiently higher than the second input voltage, so that the second peak $P_2$ is masked. On the other hand, when the first peak $P_1$ is input, the mask signal is not supplied to the comparator 12 from the transistor 11, so that the above-described comparison is performed between the first input signal and the second input signal. For the above-described operation to be adequately performed, settings are made to satisfy the following conditions by adjusting the voltage of the bias power supply 14 and the resistances of the resistors. That is, the voltage $V_2$, which is the magnetic flux detection output while the magnetic flux is not detected by the inductor 7, must be lower than the voltage $V_1$ supplied to the non-inverting input of the comparator 12. In addition, the positive-polarity peak $P_1$ which is obtained when the inductor 7 detects the magnetic flux must be higher than the voltage $V_1$.

The comparator output includes the falling edge at the time when the second input voltage exceeds the first input voltage, and also includes the rising edge at the same time when the first input voltage exceeds the second input voltage. The first input exceeds the second input voltage at the time when the induced voltage obtained by the inductor 7 is approximately zero. The index signal is generated by using the rising edge of the comparator output.

The index signal provides a pulse at the time when the comparator output provides the rising edge, that is, the time when the magnetic flux detection output is approximately zero. Since the amplitude of the magnetic flux detection signal is completely free from temperature variation, time intervals between the pulses of the index signal are not affected by temperature variation. In addition, even when the magnetic flux detection signal obtained from the inductor 7 includes two peaks $P_1$ and $P_2$ of the same polarity and approximately the same magnitude, the index signal provides a pulse at precise times since one of the peaks, $P_2$, is masked by applying the mask signal.

Note that alterations may be made in the above embodiments without changing the basic invention, such as varying the number or shape of the attachment tabs without modifying their basic function, varying the number of the pole pieces of the iron core member, using other materials for the mount (such as plastic, resin or ceramic-based materials), fastening the mount to the housing by other means (such as permanent materials like epoxy and solder, or removable materials such as clips and clamps), and varying the number and shape of the restraining hooks of the mount without modifying their basic function. Similarly, the rotator magnet may be comprised of other magnetic materials rather than resin or plastic-based materials and may have fewer or more than 16 portions. These are but a few of the minor modifications that may be made to the embodiments above without departing from the gist of the invention.

Accordingly, the present invention provides an index position detector that is lighter than a conventional index position detector and thus it is possible to decrease the size, weight and cost of the motor used. The invention also realizes a high-precision determination of a starting point for writing data on a rotating recording media as the sensitivity of the magnetic flux detection is increased by using the change in flux of the magnetic field rather than absolute flux. In addition, the temperature stability of the index position detector is increased. Further, the entire body as well as the spindle motor of the index position detector may be lighter and smaller than that of the conventional index position detector. Thus, the index position detector of the present invention is simpler and the cost of construction is lower than that of conventional index position detectors.

What is claimed is:

1. An index position detector for a spindle motor, comprising:
   a circuit board disposed above a mount;
   a rotor yoke supported by the mount and having a flange portion with an inner surface;
   a rotor magnet which is provided on the inner surface of the flange portion of the rotor yoke;
   a window portion formed in said flange portion such that a part of said rotor magnet faces outwardly; and
   an inductor which is disposed in a stator section to oppose a periphery of said flange portion and which detects a magnetic flux of said rotor magnet via said window portion,
   wherein the circuit board does not extend over one side of the mount relative to a rotational center of the rotor yoke and has a total area that is smaller than half a total area of the mount.

2. An index position detector for a spindle motor, according to claim 1, the inductor having a coil with a central axis, the central axis of the coil approximately parallel to a tangential direction of the periphery of said rotor yoke.

3. An index position detector for a spindle motor according to claim 1, wherein said spindle motor is used to rotate a recording media.

4. A motor apparatus comprising:
   a circuit board which is disposed above a mount;
   a rotor yoke which is rotatably supported by said mount and has a flange portion with an inner surface;
   a rotor magnet which is provided on the inner surface of the flange portion of said rotor yoke;
   stator coils which are disposed between said rotor yoke and said mount and which are arranged radially around a rotational center of said rotor yoke;
   lands which are provided on said circuit board at positions between said stator coils to connect coil terminals of said stator coils; and
   an inductor which is mounted on said circuit board to oppose a periphery of said flange portion and which detects a magnetic flux of said rotor magnet via a window portion,
   wherein said circuit board does not extend over one side of the mount relative to said rotational center of said rotor yoke.

5. A motor apparatus according to claim 4, wherein said circuit board comprises a total area that is smaller than half a total area of said mount.

6. A motor apparatus according to claim 4, wherein said motor apparatus is used to rotate a recording media.

7. An index position detector for a spindle motor, comprising:
   a rotatable rotor magnet having an associated magnetic flux; and
   a detector through which the magnetic flux passes and which detects a change over time of the magnetic flux, the change over time of the magnetic flux associated with rotation of said rotatable rotor magnet, said detector being an inductor,
   wherein the inductor is mounted on a circuit board positioned on a mount, the circuit board does not extend over one side of the mount relative to a rotational center of a rotor yoke supported by the mount and on which the rotor magnet is mounted, and the circuit board has a total area that is smaller than half a total area of the mount.

8. The index position detector of claim 7, further comprising:
   a motor to rotate the rotatable rotor magnet;
   a rotor yoke having a flange portion with an inner surface, the rotatable rotor magnet provided on the inner surface of the flange portion of the rotor yoke, the flange portion having a window portion formed such that a part of the rotatable rotor magnet faces outwardly through the window portion; and
   a stator section opposing a periphery of said flange portion, the detector disposed in the stator section and which detects the change in the magnetic flux associated with the rotation of said rotatable rotor magnet.

9. The index position detector of claim 8, the detector positioned to maximize the magnetic flux passing through the detector at a position in which the rotatable rotor magnet is substantially most proximate to the detector.

10. The index position detector of claim 9, further comprising:
    a signal having a peak and a sub-peak generated by the detector in accordance with the change in the magnetic flux associated with the rotation of the rotatable rotor magnet; and
    an index signal generating circuit to generate an index signal for the rotation of the rotatable rotor magnet and to exclude the sub-peak of the signal by masking the sub-peak of the signal.

11. The index position detector of claim 10, the index signal generating circuit comprising a comparator having a mask signal supplied to the comparator when the sub-peak of the signal is also supplied to the comparator, thereby masking the sub-peak of the signal by comparing the mask signal to the sub-peak of the signal, the mask signal not being supplied to the comparator when the peak of the signal is supplied to the comparator.

12. The index position detector of claim 11, the mask signal being larger than the sub-peak of the signal.

13. The index position detector of claim 11, wherein only a single index signal is generated by the index signal generating circuit for one complete rotation of the rotatable rotor magnet.

14. The index position detector of claim 10, the index signal generating circuit comprising a comparator having a combination of a mask signal and a base signal supplied to the comparator when the sub-peak of the signal is also supplied to the comparator, the mask signal not being supplied to the comparator when the peak of the signal is supplied to the comparator.

15. The index position detector of claim 14, the base signal being smaller than the peak of the signal and the combination of the mask signal and the base signal being larger than the sub-peak of the signal.

16. The index position detector of claim 14, wherein only a single index signal is generated by the index signal generating circuit for one complete rotation of the rotatable rotor magnet.

17. An index position detector for a spindle motor according to claim 7, wherein said spindle motor is used to rotate a recording media.

18. A method to detect an index position of a spindle motor having a rotatable rotor magnet with an associated magnetic flux passing through a detector, said detector being an inductor, the method comprising:

mounting the detector on a circuit board, the circuit board on a mount, and the rotor magnet on a rotor yoke supported by the mount;

positioning the circuit board such that the circuit board does not extend over one side of the mount relative to a rotational center of the rotor yoke;

limiting an area of the circuit board such that the area of the circuit board is smaller than half a total area of the mount;

rotating the rotatable rotor magnet; and detecting a change over time of the magnetic flux associated with rotation of the rotatable rotor magnet.

19. The method of claim 18, further comprising maximizing the magnetic flux passing through the detector when the rotatable rotor magnet is substantially most proximate to the detector.

20. The method of claim 19, further comprising:

generating a signal associated with the change over time of the magnetic flux and having a peak and a sub-peak; and masking the sub-peak of the signal.

21. The method of claim 20, the masking of the sub-peak of the signal comprising generating a mask signal subsequent to generating the peak of the signal and prior to the generating the sub-peak of the signal.

22. The method of claim 21, the masking of the sub-peak of the signal further comprising:

combining the mask signal with a base signal such that a combination of the mask signal with the base signal is larger than the sub-peak of the signal; and comparing the combination of the mask signal with the base signal to the sub-peak of the signal.

23. The method of claim 21, the masking of the sub-peak of the signal comprising comparing the mask signal to the sub-peak of the signal.

24. The method of claim 21, the generating of the mask signal comprising generating a mask signal larger than the sub-peak of the signal.

25. The method of claim 22, further comprising generating a single index signal for each complete rotation of the rotatable rotor magnet.

26. The method of claim 20, further comprising generating a single index signal for each complete rotation of the rotatable rotor magnet subsequent to generating the peak of the signal and prior to the generating the sub-peak of the signal.

27. The method of claim 18, further comprising generating a single index signal for each complete rotation of the rotatable rotor magnet.

28. The method of claim 18, further comprising the step of rotating a recording media.

* * * * *